United States Patent
Maeda et al.

(10) Patent No.: US 11,466,402 B2
(45) Date of Patent: *Oct. 11, 2022

(54) SYNTHETIC LEATHER

(71) Applicant: DIC Corporation, Tokyo (JP)

(72) Inventors: Ryo Maeda, Takaishi (JP); Tomohiro Tetsui, Takaishi (JP)

(73) Assignee: DIC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/734,671

(22) PCT Filed: May 9, 2019

(86) PCT No.: PCT/JP2019/018506
§ 371 (c)(1),
(2) Date: Dec. 3, 2020

(87) PCT Pub. No.: WO2019/235125
PCT Pub. Date: Dec. 12, 2019

(65) Prior Publication Data
US 2021/0230799 A1 Jul. 29, 2021

(30) Foreign Application Priority Data
Jun. 7, 2018 (JP) .............................. JP2018-109463

(51) Int. Cl.
| D06N 3/14 | (2006.01) |
| C09J 175/04 | (2006.01) |
| D06N 3/08 | (2006.01) |
| C08G 18/76 | (2006.01) |

(52) U.S. Cl.
CPC ............ *D06N 3/145* (2013.01); *C09J 175/04* (2013.01); *D06N 3/08* (2013.01); *D06N 3/147* (2013.01); *C08G 18/7621* (2013.01); *D06N 2209/103* (2013.01); *D06N 2209/143* (2013.01); *D06N 2209/1678* (2013.01); *D06N 2211/28* (2013.01)

(58) Field of Classification Search
None
See application file for complete search history.

(56) References Cited

U.S. PATENT DOCUMENTS

| 2010/0247895 A1 | 9/2010 | Uemura et al. |
| 2018/0030650 A1 | 2/2018 | Tetsui |
| 2021/0230797 A1* | 7/2021 | Maeda ................. C08G 18/755 |
| 2021/0230800 A1* | 7/2021 | Maeda ..................... D06N 3/08 |

FOREIGN PATENT DOCUMENTS

| EP | 3438205 A1 | 2/2019 |
| JP | 2007-119749 A | 5/2007 |
| WO | 2016/140025 A1 | 9/2016 |
| WO | 2017/169244 A1 | 10/2017 |

OTHER PUBLICATIONS

Supplementary European Search Report dated Jun. 9, 2021, issued for European U.S. Appl. No. 19814874.4.
International Search Report dated Jul. 16, 2019, issued for PCT/JP2019/018506.

* cited by examiner

*Primary Examiner* — Arti Singh-Pandey
(74) *Attorney, Agent, or Firm* — Locke Lord LLP

(57) ABSTRACT

The present invention provides a synthetic leather including at least a base (i), an adhesive layer (ii), and a skin layer (iii). The adhesive layer (ii) and the skin layer (iii) are both formed of a urethane resin composition including a urethane resin and water, the urethane resin being produced using an aromatic polyisocyanate as a raw material. The urethane resin composition forming the adhesive layer (ii) preferably includes a urethane resin (A) and water (B), the urethane resin (A) being produced using an aromatic polyisocyanate (a1) as a raw material. The aromatic polyisocyanate (a1) preferably includes toluene diisocyanate. It is preferable that the urethane resin (A) include an anionic group and the concentration of the anionic group in the urethane resin (A) be 0.35 mmol/g or less.

9 Claims, No Drawings

SYNTHETIC LEATHER

CROSS REFERENCE TO RELATED APPLICATIONS

This application is related to four co-pending applications: "SYNTHETIC LEATHER" filed even date herewith in the name of Ryo Maeda as a national phase entry of PCT/JP2019/018502; "SYNTHETIC LEATHER" filed even date herewith in the name of Ryo Maeda as a national phase entry of PCT/JP2019/018503; "SYNTHETIC LEATHER" filed even date herewith in the name of Ryo Maeda as a national phase entry of PCT/JP2019/018504; and "SYNTHETIC LEATHER" filed even date herewith in the name of Ryo Maeda as a national phase entry of PCT/JP2019/018505; which applications are assigned to the assignee of the present application and all four incorporated by reference herein.

TECHNICAL FIELD

The present invention relates to a synthetic leather.

BACKGROUND ART

Polyurethane resins have been broadly used in the production of synthetic leather (including artificial leather) because of their high mechanical strength and good feeling. Although solvent-based urethane resins including N,N-dimethylformamide (DMF) have been used for use in the production of synthetic leather in most cases, there has been a demand for using DMF-free urethane resins in the production of the layers constituting synthetic leather in the context of DMF regulations in Europe, strengthening of the regulations on VOC emissions in China and Taiwan, DMF regulations in major apparel companies, and the like.

In order to address the above circumstances, a urethane resin composition that is, for example, an aqueous dispersion of a urethane resin has been broadly studied (e.g., see PTL 1). While the shift of the material for the skin layer of synthetic leather from a solvent-based urethane resin to a water-based urethane resin has been gradually increased in the market as in the invention described in PTL 1, the shift of the urethane resin for the adhesive layer to a water-based urethane resin has not been done. This is primarily because the peel strengths of urethane resins provided in the form of an aqueous dispersion or the like are not sufficiently high compared with solvent-based urethane resins.

Since synthetic leather materials, which frequently come into contact with the human body, are also required to have resistance to oleic acid, etc. contained in sebum, there have also been demands for further improvement of the skin layer. However, an environment-responsive synthetic leather that has the above-described properties required for synthetic leather has not been devised.

CITATION LIST

Patent Literature

PTL 1: Japanese Unexamined Patent Application Publication No. 2007-119749

SUMMARY OF INVENTION

Technical Problem

An object to be solved by the present invention is to provide a synthetic leather that is excellent in terms of peel strength and chemical resistance.

Solution to Problem

The present invention provides a synthetic leather including at least a base (i), an adhesive layer (ii), and a skin layer (iii). The adhesive layer (ii) and the skin layer (iii) are both formed of a urethane resin composition including a urethane resin and water, the urethane resin being produced using an aromatic polyisocyanate as a raw material.

Advantageous Effects of Invention

The synthetic leather according to the present invention is excellent in terms of peel strength and chemical resistance.

In addition, since the adhesive layer (ii) and/or the skin layer (iii) includes the specific urethane resin, the synthetic leather further has excellent lightfastness and excellent hydrolysis resistance in addition to the above-described advantageous effects.

Thus, the synthetic leather according to the present invention may be used in various applications. In particular, the synthetic leather according to the present invention may be used in applications that require high durability, such as automotive interior materials, furniture, and sports shoes, in which it has been considered difficult to use water-based urethane resins instead of solvent-based urethane resins.

DESCRIPTION OF EMBODIMENTS

The synthetic leather according to the present invention includes at least a base (i), an adhesive layer (ii), and a skin layer (iii).

It is necessary that the adhesive layer (ii) and the skin layer (iii) be both formed of a urethane resin composition that includes a urethane resin produced using an aromatic polyisocyanate as a raw material and water.

Adding a urethane resin produced using an aromatic polyisocyanate, which has a strong intermolecular interaction, as a raw material to both adhesive layer (ii) and skin layer (iii) enables a markedly high peel strength and markedly high chemical resistance to be achieved.

The urethane resin composition used for forming the adhesive layer (ii) is preferably, for example, a urethane resin composition including a urethane resin (A) produced using an aromatic polyisocyanate (a1) as a raw material and water (B).

The urethane resin (A) can be dispersed in the water (B). Examples of the urethane resin (A) include a urethane resin having a hydrophilic group, such as an anionic group, a cationic group, or a nonionic group; and a urethane resin forcibly dispersed in the water (B) with an emulsifier. The above urethane resins (A) may be used alone or in combination of two or more.

For producing the urethane resin having an anionic group, for example, one or more compounds selected from the group consisting of compounds having a carboxyl group and compounds having a sulfonyl group may be used as a raw material.

Examples of the compounds having a carboxyl group include 2,2-dimethylolpropionic acid, 2,2-dimethylolbutanoic acid, 2,2-dimethylolbutyric acid, 2,2-dimethylolpropionic acid, and 2,2-valeric acid. The above compounds may be used alone or in combination of two or more.

Examples of the compounds having a sulfonyl group include 3,4-diaminobutanesulfonic acid, 3,6-diamino-2-toluenesulfonic acid, 2,6-diaminobenzenesulfonic acid, N-(2-aminoethyl)-2-aminosulfonic acid, and N-(2-aminoethyl)-2-aminoethylsulfonic acid. The above compounds may be used alone or in combination of two or more.

A part or the entirety of the carboxyl or sulfonyl groups may be neutralized with a basic compound in the urethane resin composition. Examples of the basic compound include organic amines, such as ammonia, triethylamine, pyridine, and morpholine; alkanolamines, such as monoethanolamine and dimethylethanolamine; and metal basic compounds including sodium, potassium, lithium, calcium, or the like.

For producing the urethane resin having a cationic group, for example, one or more compounds having an amino group may be used as a raw material.

Examples of the compounds having an amino group include compounds having primary and secondary amino groups, such as triethylenetetramine and diethylenetriamine; and compounds having a tertiary amino group, such as N-alkyldialkanolamine (e.g., N-methyldiethanolamine or N-ethyldiethanolamine) and N-alkyldiaminoalkylamine (e.g., N-methyldiaminoethylamine or N-ethyldiaminoethylamine). The above compounds may be used alone or in combination of two or more.

For producing the urethane resin having a nonionic group, for example, one or more compounds having an oxyethylene structure may be used as a raw material.

Examples of the compounds having an oxyethylene structure include polyether polyols having an oxyethylene structure, such as polyoxyethylene glycol, polyoxyethylene polyoxypropylene glycol, and polyoxyethylene polyoxytetramethylene glycol. The above compounds may be used alone or in combination of two or more.

Examples of the emulsifier used for producing the urethane resin forcibly dispersed in the water (B) include nonionic emulsifiers, such as polyoxyethylene nonylphenyl ether, polyoxyethylene lauryl ether, polyoxyethylene styryl phenyl ether, polyoxyethylene sorbitol tetraoleate, and a polyoxyethylene-polyoxypropylene copolymer; anionic emulsifiers, such as a fatty acid salt (e.g., sodium oleate), an alkyl sulfate ester salt, an alkylbenzene sulfonate salt, an alkyl sulfosuccinate salt, a naphthalene sulfonate salt, a polyoxyethylene alkyl sulfate salt, an alkane sulfonate sodium salt, and an alkyl diphenyl ether sulfonic acid sodium salt; and cationic emulsifiers, such as an alkylamine salt, an alkyltrimethylammonium salt, and an alkyldimethylbenzylammonium salt. The above emulsifiers may be used alone or in combination of two or more.

The urethane resin (A) is preferably the urethane resin having an anionic group in order to further enhance dispersion stability in water, hydrolysis resistance, and lightfastness.

The urethane resin having an anionic group may be, for example, the product of reaction of the above-described raw material used for producing the urethane resin having an anionic group, an aromatic polyisocyanate (a1), a polyol (a2), and a chain extender (a3) that is optionally used as needed.

The proportion of the raw material used for producing the urethane resin having an anionic group to the polyol (a2) is preferably 0.05% by mass or more, is more preferably 0.1% by mass or more, is more preferably 0.5% by mass or more, and is further preferably 1% by mass or more; is preferably 10% by mass or less, is more preferably 6.2% by mass or less, is further preferably 3% by mass or less, and is particularly preferably 2.7% by mass or less; and is preferably 0.05% to 10% by mass, is more preferably 0.1% to 6.2% by mass, is further preferably 0.5% to 3% by mass, and is particularly preferably 1% to 2.7% by mass, in order to adjust the anionic group concentration in the urethane resin (A) and thereby further enhance hydrolysis resistance and lightfastness.

The aromatic polyisocyanate (a1), which has strong intermolecular forces, is a component essential for further increasing peel strength due to the packing effects. Examples of the aromatic polyisocyanate (a1) include phenylene diisocyanate, toluene diisocyanate, diphenylmethane diisocyanate, naphthalene diisocyanate, polymethylene polyphenyl polyisocyanate, and carbodiimidized diphenylmethane polyisocyanate. The above aromatic polyisocyanates may be used alone or in combination of two or more. Among the above aromatic polyisocyanates, toluene diisocyanate is preferably used in order to reduce crystallinity to an adequate level and thereby further increase peel strength.

In the case where toluene diisocyanate is used as an aromatic polyisocyanate (a1), the proportion of toluene diisocyanate to the aromatic polyisocyanate (a1) is preferably 50% by mass or more and is more preferably 70% by mass or more in order to further increase peel strength.

The aromatic polyisocyanate (a1) may further include an aliphatic or alicyclic polyisocyanate that does not impair the advantageous effects of the present invention.

Examples of the aliphatic or alicyclic polyisocyanate include aliphatic and alicyclic polyisocyanates, such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, and norbornene diisocyanate. The above polyisocyanates may be used alone or in combination of two or more.

Examples of the polyol (a2) include a polyether polyol, a polyester polyol, a polycarbonate polyol, a dimer diol, an acrylic polyol, and a polybutadiene polyol. The above polyols may be used alone or in combination of two or more. Among these, a polyether polyol and/or a polycarbonate polyol is preferably used in order to further enhance hydrolysis resistance.

The number-average molecular weight of the polyol (a2) is preferably 500 to 10,000 and is more preferably 800 to 5,000 in order to further increase peel strength and the mechanical strength of the coating layer and further enhance hydrolysis resistance. The number-average molecular weight of the polyol (a2) is number-average molecular weight determined by gel permeation column chromatography (GPC).

The polyol (a2) may be used in combination with a chain extender (a3) (a chain extender that does not include any of a carboxyl group and a sulfonyl group and has a molecular weight of 50 or more and less than 500) as needed. Examples of the chain extender include a chain extender having a hydroxyl group and a chain extender having an amino group. The above chain extenders may be used alone or in combination of two or more. Among these, a chain extender having a hydroxyl group is preferably used in order to further enhance lightfastness.

Examples of the chain extender having a hydroxyl group include aliphatic polyols, such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; aromatic polyols, such as bisphenol A, 4,4'-dihydroxydiphenyl, a 4,4'-dihydroxydiphenyl ether, 4,4'-dihydroxydiphenyl sulfone, hydrogenated bisphenol A, and hydroquinone; and water. The above chain extenders may be used alone or in combination of two or more. Among these, aliphatic polyols are preferably used in order to readily reduce discoloration and further enhance lightfastness.

Examples of the chain extender having an amino group include ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine, 3,3'-dimethyl-4,4'-dicyclohexylmethanediamine, 1,2-cyclohexanediamine, 1,4-cyclohexanediamine, aminoethylethanolamine, hydrazine, diethylenetriamine, and triethylenetetramine. The above chain extenders may be used alone or in combination of two or more.

In the case where the chain extender (a3) is used, the amount of the chain extender (a3) used is preferably 0.5% to 40% by mass and is more preferably 1% to 20% by mass of the total mass of the raw materials constituting the urethane resin (A) in order to further enhance the durability of the coating layer.

For producing the urethane resin (A), for example, the raw material used for producing the urethane resin having a hydrophilic group, the aromatic polyisocyanate (a1), the polyol (a2), and the optional chain extender (a3) may be charged to react with one another in one batch. This reaction may be conducted, for example, at 50° C. to 100° C. for 3 to 10 hours.

The molar ratio of the isocyanate group included in the aromatic polyisocyanate (a1) to the total of the hydroxyl and amino groups included in the polyol (a2), the raw material used for producing the urethane resin having a hydrophilic group, and, in the case where the chain extender (a3) is used, the chain extender (a3), that is, [(Isocyanate group)/(Total of hydroxyl and amino groups)], is preferably 0.8 to 1.2 and is more preferably 0.9 to 1.1.

It is preferable to deactivate the isocyanate group that remains in the urethane resin (A) in the production of the urethane resin (A). For deactivating the isocyanate group, an alcohol having a hydroxyl group, such as methanol, is preferably used. In the case where the alcohol is used, the amount of the alcohol used is preferably 0.001 to 10 parts by mass relative to 100 parts by mass of the urethane resin (A).

An organic solvent may be used in the production of the urethane resin (A). Examples of the organic solvent include ketones, such as acetone and methyl ethyl ketone; ethers, such as tetrahydrofuran and dioxane; acetate esters, such as ethyl acetate and butyl acetate; nitriles, such as acetonitrile; and amides, such as dimethylformamide and N-methylpyrrolidone. The above organic solvents may be used alone or in combination of two or more. The organic solvent is preferably removed by distillation or the like in the production of the urethane resin composition.

The anionic group concentration in the urethane resin (A) produced by the above-described method is preferably 0.35 mmol/g or less in order to further enhance hydrolysis resistance. Setting the anionic group concentration to fall within the above range may limit the degradation of hydrolysis resistance caused by hydrophilic groups while maintaining the dispersibility of the urethane resin (A) in water and peel strength. The anionic group concentration in the urethane resin (A) is preferably 0.005 mmol/g or more and is more preferably 0.01 mmol/g or more; is preferably 0.25 mmol/g or less and is more preferably 0.22 mmol/g or less; and is preferably 0.005 to 0.25 mmol/g and is more preferably 0.01 to 0.22 mmol/g in order to further enhance hydrolysis resistance. The concentration of an anionic group in the urethane resin (A) is the quotient of the number of moles of the anionic groups derived from the raw material used for producing the urethane resin having an anionic group divided by the total mass of the raw materials constituting the urethane resin (A).

The aromatic ring concentration in the urethane resin (A) is preferably 0.1 mol/kg or more, is more preferably 0.3 mol/kg or more, and is further preferably 0.4 mol/kg or more; is preferably 2.5 mol/kg or less, is more preferably 2 mol/kg or less, and is further preferably 1.5 mol/kg or less; and is preferably 0.1 to 2.5 mol/kg, is more preferably 0.3 to 2 mol/kg, and is further preferably 0.4 to 1.5 mol/kg in order to further increase peel strength. In the above calculation, the molecular weights of benzene and naphthalene that do not include a substituent are used as the molecular weights of aromatic rings.

The weight-average molecular weight of the urethane resin (A) is preferably 2,000 or more, is more preferably 4,000 or more, and is further preferably 6,000 or more; is preferably 150,000 or less, is more preferably 100,000 or less, and is further preferably 70,000 or less; and is preferably 2,000 to 150,000, is more preferably 4,000 to 100,000, and is further preferably 6,000 to 70,000 in order to further increase peel strength. The weight-average molecular weight of the urethane resin (A) is weight-average molecular weight determined by gel permeation column chromatography (GPC).

Examples of the water (B) include ion-exchange water, distilled water, and tap water. Among these, ion-exchange water that does not contain a large amount of impurities is preferably used. The content of the water (B) in the urethane resin composition is preferably 20% to 90% by mass and is more preferably 40% to 80% by mass from the viewpoints of workability, ease of coating, and preservation stability.

The urethane resin composition used for producing the adhesive layer (ii), which includes the urethane resin (A) and the aqueous medium (B), may optionally include other additives.

Examples of the other additives include a urethanizing catalyst, a neutralizer, a crosslinking agent, a silane coupling agent, a thickener, a filler, a thixotropy-imparting agent, a tackifier, a wax, a heat stabilizer, a light stabilizer, a fluorescent brightening agent, a blowing agent, a pigment, a dye, an electrical conductivity-imparting agent, an antistatic agent, a moisture permeability improver, a water repellent, an oil repellent, a hollow foam, a flame retardant, a desiccant, a moisture absorbent, a deodorant, a foam stabilizer, an antiblocking agent, and an antihydrolysis agent. The above additives may be used alone or in combination of two or more.

It is necessary that the urethane resin composition used for producing the skin layer (iii) be, for example, a urethane resin composition that includes a urethane resin (X) produced using an aromatic polyisocyanate (x1) as a raw material, a nonionic emulsifier (Y), and water (Z).

The urethane resin (X) can be dispersed in the water (Z). Examples of the urethane resin (X) include a urethane resin having a hydrophilic group, such as an anionic group, a cationic group, or a nonionic group; and a urethane resin forcibly dispersed in the water (B) with an emulsifier. The above urethane resins (A) may be used alone or in combination of two or more.

The method for imparting a hydrophilic group to the urethane resin (X) and the method for forcibly dispersing the urethane resin in water with an emulsifier are the same as for the urethane resin (A).

The urethane resin (X) is preferably a urethane resin having an anionic group in order to further enhance dispersion stability in water.

The urethane resin having an anionic group may be, for example, the product of reaction of the above-described raw material used for producing the urethane resin having an anionic group, an aromatic polyisocyanate (x1), a polyol (x2), and an extender (x3).

The proportion of the raw material used for producing the urethane resin having an anionic group to the polyol (x2) is preferably 0.05% to 10% by mass and is more preferably 0.1% to 7% by mass in order to further enhance chemical resistance.

The use of the aromatic polyisocyanate (x1) enables excellent feeling and excellent chemical resistance to be achieved. Examples of the aromatic polyisocyanate (x1) include phenylene diisocyanate, tolylene diisocyanate, diphenylmethane diisocyanate, naphthalene diisocyanate, polymethylene polyphenyl polyisocyanate, and carbodiimidized diphenylmethane polyisocyanate. The above aromatic polyisocyanates may be used alone or in combination of two or more. Among these, diphenylmethane diisocyanate is preferably used in order to further enhance feeling and chemical resistance.

The proportion of the diphenylmethane diisocyanate used to the aromatic polyisocyanate (x1) is preferably 60% by mass or more, is more preferably 70% by mass or more, and is further preferably 80% by mass or more in order to further enhance feeling and chemical resistance.

The aromatic polyisocyanate (x1) may be used in combination with another polyisocyanate as needed. Examples of the other polyisocyanate include aliphatic and alicyclic polyisocyanates, such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, and norbornene diisocyanate. The above polyisocyanates may be used alone or in combination of two or more.

Examples of the polyol (x2) include a polyether polyol, a polyester polyol, a polycarbonate polyol, a dimer diol, an acrylic polyol, and a polybutadiene polyol. The above polyols may be used alone or in combination of two or more. Among these, a polycarbonate polyol is preferably used in order to further enhance chemical resistance.

The number-average molecular weight of the polyol (x2) is preferably 500 to 8,000 and is more preferably 800 to 3,000 in order to further enhance chemical resistance and further increase mechanical strength. The number-average molecular weight of the polyol (x2) is number-average molecular weight determined by gel permeation column chromatography (GPC).

Examples of the chain extender (x3) include a chain extender that has a hydroxyl group and a molecular weight of 50 or more and less than 500 and a chain extender having an amino group. The above chain extenders may be used alone or in combination of two or more.

Examples of the chain extender having a hydroxyl group include aliphatic polyols, such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; aromatic polyols, such as bisphenol A, 4,4'-dihydroxydiphenyl, a 4,4'-dihydroxydiphenyl ether, 4,4'-dihydroxydiphenyl sulfone, hydrogenated bisphenol A, and hydroquinone; and water. The above chain extenders may be used alone or in combination of two or more. Among these, aliphatic polyols are preferably used in order to further enhance lightfastness.

Examples of the chain extender having an amino group include ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine, 3,3'-dimethyl-4,4'-dicyclohexylmethanediamine, 1,2-cyclohexanediamine, 1,4-cyclohexanediamine, aminoethylethanolamine, hydrazine, diethylenetriamine, and triethylenetetramine. The above chain extenders may be used alone or in combination of two or more.

The amount of the chain extender (x3) used is preferably 0.5% to 20% by mass and is more preferably 1% to 10% by mass of the total mass of the raw materials constituting the urethane resin (X) in order to further enhance the durability of the coating layer, chemical resistance, and lightfastness.

For producing the urethane resin (X), for example, the reaction of the raw material used for producing the urethane resin having a hydrophilic group, the polyol (x2), and the aromatic polyisocyanate (x1) is conducted to prepare a urethane prepolymer having an isocyanate group and the reaction of the urethane prepolymer with the chain extender (x3) is conducted; or the raw material used for producing the urethane resin having a hydrophilic group, the polyol (x2), the aromatic polyisocyanate (x1), and the chain extender (x3) are charged to react with one another in one batch. The above reaction is preferably conducted, for example, at 50° C. to 100° C. for 3 to 10 hours.

The molar ratio of the isocyanate group included in the aromatic polyisocyanate (x1) to the total of the hydroxyl and amino groups included in the raw material used for producing the urethane resin having a hydrophilic group, the polyol (x2), and the chain extender (x3), that is, [(Isocyanate group)/(Hydroxyl and amino groups)], is preferably 0.8 to 1.2 and is more preferably 0.9 to 1.1.

It is preferable to deactivate the isocyanate group that remains in the urethane resin (X) in the production of the urethane resin (X). For deactivating the isocyanate group, an alcohol having one hydroxyl group, such as methanol, is preferably used. In the case where the alcohol is used, the amount of the alcohol used is preferably 0.001 to 10 parts by mass relative to 100 parts by mass of the urethane resin (X).

An organic solvent may be used in the production of the urethane resin (X). Examples of the organic solvent include ketones, such as acetone and methyl ethyl ketone; ethers, such as tetrahydrofuran and dioxane; acetate esters, such as ethyl acetate and butyl acetate; nitriles, such as acetonitrile; and amides, such as dimethylformamide and N-methylpyrrolidone. The above organic solvents may be used alone or in combination of two or more. The above organic solvents are preferably removed by distillation or the like in the production of the urethane resin composition.

The urethane resin (X) preferably has a urea bond content of 1.2 mol/kg or less in order to further enhance lightfastness and chemical resistance.

The urea bond is formed upon the reaction of the amino group and polyisocyanate which are produced when the amino group included in the chain extender (x3) and an isocyanate group are reacted with water. Thus, adjusting the amount of the chain extender having an amino group which is used as a chain extender (x3) and converting all the isocyanates to urethane prior to the emulsification operation enables the urea bond content in the urethane resin (X) to be adjusted.

The aromatic ring concentration in the urethane resin (X) is preferably 0.1 mol/kg or more, is more preferably 0.5 mol/kg or more, is further preferably 1 mol/kg or more, and is particularly preferably 1.55 mol/kg or more; is preferably 50 mol/kg or less, is more preferably 30 mol/kg or less, is further preferably 10 mol/kg or less, and is particularly preferably 8 mol/kg or less; and is preferably 0.1 to 50 mol/kg, is more preferably 0.5 to 30 mol/kg, is further preferably 1 to 10 mol/kg, and is particularly preferably 1.55 to 8 mol/kg, in order to further enhance chemical resistance and lightfastness. In the above calculation, the molecular weights of benzene and naphthalene that do not include a substituent are used as the molecular weights of aromatic rings.

The weight-average molecular weight of the urethane resin (X) is preferably more than 60,000, is more preferably 100,000 or more, and is further preferably 150,000 or more; is preferably 5,000,000 or less, is more preferably 1,000,000 or less, and is further preferably 700,000 or less; and is preferably more than 60,000 to 5,000,000, is more preferably 100,000 to 1,000,000, and is further preferably 150,000 to 700,000 in order to further enhance chemical resistance. The weight-average molecular weight of the urethane resin (X) is weight-average molecular weight determined by gel permeation column chromatography (GPC).

The nonionic emulsifier (Y) is a component used for enhancing the dispersion stability of the urethane resin (X) having an aromatic ring in water. Examples of the nonionic emulsifier (Y) include nonionic emulsifiers having an oxyethylene group, such as polyoxyethylene nonylphenyl ether, polyoxyethylene octylphenyl ether, polyoxyethylene distyrenated phenyl ether, polyoxyethylene lauryl ether, polyoxyethylene oleyl ether, polyoxyethylene stearyl ether, and polyoxyethylene sorbitol tetraoleate. The average number of moles of the oxyethylene group added is preferably 1 to 50, is more preferably 3 to 30, and is further preferably 5 to 20 in order to further enhance dispersion stability in water. The above nonionic emulsifiers may be used alone or in combination of two or more.

The amount of the nonionic emulsifier (Y) used is preferably 0.1 to 30 parts by mass and is more preferably 1 to 10 parts by mass relative to 100 parts by mass of the urethane resin (X) in order to further enhance dispersion stability in water and chemical resistance.

The water (Z) may be the same as the water (B). The mass ratio of the urethane resin (X) to the aqueous medium (Z), that is, [(X)/(Z)], is preferably 10/80 to 70/30 and is more preferably 20/80 to 60/40 in order to further enhance workability and the feeling of the coating layer.

The urethane resin composition, which includes the urethane resin (X), the nonionic emulsifier (Y), and the water (Z) as essential picture components, may optionally include a neutralizer and other additives as needed.

The neutralizer is used for neutralizing the carboxyl group included in the urethane resin (X). Examples of the neutralizer include nonvolatile bases, such as sodium hydroxide and potassium hydroxide; and tertiary amines, such as trimethylamine, triethylamine, dimethylethanolamine, methyldiethanolamine, and triethanol. The above neutralizers may be used alone or in combination of two or more.

It is preferable to use the neutralizer such that the molar ratio of the neutralizer to the number of moles of the hydrophilic group included in the urethane resin (X) is 0.8 to 1.2.

Examples of the other additives include a coagulant, a urethanizing catalyst, a silane coupling agent, a filler, a thixotropy-imparting agent, a tackifier, a wax, a heat stabilizer, a light stabilizer, a fluorescent brightening agent, a blowing agent, a pigment, a dye, an electrical conductivity-imparting agent, an antistatic agent, a moisture permeability improver, a water repellent, an oil repellent, a hollow foam, a flame retardant, a desiccant, a moisture absorbent, a deodorant, a foam stabilizer, an antiblocking agent, an antihydrolysis agent, and a thickener. The above additives may be used alone or in combination of two or more.

The synthetic leather according to the present invention is described below.

The synthetic leather according to the present invention includes at least the base (i), the adhesive layer (ii), and the skin layer (iii). Specific examples of the structure of the synthetic leather include the following:

(1) Base (i), adhesive layer (ii), and skin layer (iii)

(2) Base (i), adhesive layer (ii), intermediate layer, and skin layer (iii)

(3) Base (i), porous layer, adhesive layer (ii), and skin layer (iii)

(4) Base (i), porous layer, adhesive layer (ii), intermediate layer, and skin layer (iii)

Examples of the base (i) include a fiber base, such as a nonwoven fabric, woven fabric, or knitted fabric made of a polyester fiber, a polyethylene fiber, a nylon fiber, an acrylic fiber, a polyurethane fiber, an acetate fiber, a rayon fiber, a polylactic acid fiber, cotton, hemp, silk, wool, a glass fiber, a carbon fiber, a mixed fiber made of the above fibers, or the like; a base prepared by impregnating the above nonwoven fabric with a resin, such as a polyurethane resin; a base prepared by forming a porous layer on the above nonwoven fabric; and a resin base composed of thermoplastic urethane (TPU) or the like.

Examples of the porous layer include a porous layer formed by a known wet deposition method using a solvent-based urethane resin composition; and a porous layer produced by forming pores in a water-based urethane resin composition by a known method.

Examples of the material constituting the intermediate layer include known water-based urethane resins, solvent-based urethane resins, solvent-free urethane resins, water-based acrylic resins, silicone resins, polypropylene resins, and polyester resins. The above resins may be used alone or in combination of two or more.

Optionally, a surface treatment layer may be disposed on the skin layer (iii) in order to, for example, prevent scratching. Examples of the material constituting the surface treatment layer include known water-based urethane resins, solvent-based urethane resins, solvent-free urethane resins, water-based acrylic resins, silicone resins, polypropylene resins, and polyester resins. The above resins may be used alone or in combination of two or more.

The method for producing a synthetic leather having the structure (1) above is described below.

For producing the synthetic leather, for example, a skin layer-forming urethane resin composition is applied to a base that has been subjected to a releasing treatment, the resulting coating layer is dried and processed to form a skin layer (iii), an adhesive layer-forming urethane resin composition is applied to the skin layer (iii), and the resulting coating layer is dried to form an adhesive layer (ii), which is then bonded to the base (i). Alternatively, the adhesive layer (ii) may be formed by applying the adhesive layer-forming urethane resin composition to the skin layer (iii) and drying the coating layer after the coating layer has been bonded to the base (i).

For applying the skin layer-forming and adhesive layer-forming urethane resin compositions, for example, an applicator, a roll coater, a spray coater, a T-die coater, a knife coater, and a Comma Coater may be used.

The drying of the urethane resin composition is performed, for example, at 40° C. to 130° C. for 1 to 10 minutes. The thicknesses of the adhesive layer (ii) and the skin layer (iii) are determined appropriately in accordance with the application in which the synthetic leather is used and are, for example, 0.5 to 100 μm.

Subsequent to the production of the synthetic leather, for example, aging may be performed at 30° C. to 100° C. for 1 to 10 days as needed.

The synthetic leather according to the present invention described above is excellent in terms of peel strength and chemical resistance. In addition, since the adhesive layer (ii) and/or the skin layer (iii) includes the specific urethane resin, the synthetic leather further has excellent chemical resistance and excellent hydrolysis resistance in addition to the above-described advantageous effects.

Thus, the synthetic leather according to the present invention may be used in various applications. In particular, the synthetic leather according to the present invention may be used in applications that require high durability, such as automotive interior materials, furniture, and sports shoes, in which it has been considered difficult to use water-based urethane resins instead of solvent-based urethane resins.

EXAMPLES

The present invention is described further in detail with reference to Examples below.

[Synthesis Example 1] Preparation of Adhesive Layer-Forming Urethane Resin (A-1) Composition To a four-necked flask equipped with a stirrer, a reflux condenser, a thermometer, and a nitrogen capillary tube, 500 parts by mass of polycarbonate diol ("DURANOL T5652" produced by Asahi Kasei Chemicals Corporation, number-average molecular weight: 2,000), 8 parts by mass of 2,2-dimethylolpropionic acid (hereinafter, abbreviated as "DMPA"), and 394 parts by mass of methyl ethyl ketone were added in a nitrogen stream. After the above components had been mixed to form a uniform mixture, 68 parts by mass of toluene diisocyanate (hereinafter, abbreviated as "TDI") was added to the mixture. Then, 0.1 parts by mass of dibutyltin dilaurate was added to the mixture. Subsequently, a reaction was conducted at 70° C. for about 4 hours. Then, 14 parts by mass of 1,3-butanediol was added to the flask. After a reaction had been conducted at 70° C. for about 1 hour, the reaction was terminated. Hereby, a methyl ethyl ketone solution of a urethane polymer was prepared. To the methyl ethyl ketone solution of a urethane polymer prepared by the above-described method, 6 parts by mass of triethylamine was added in order to neutralize the carboxyl group included in the urethane polymer. Subsequently, 886 parts by mass of ion-exchange water was added to the solution. Then, methyl ethyl ketone was removed from the solution by distillation under reduced pressure. Hereby, an adhesive layer-forming urethane resin (A-1) composition (nonvolatile content; 40% by mass, anionic group (carboxyl group, the same applies hereinafter) concentration; 0.11 mmol/g, weight-average molecular weight; 29,000, aromatic ring concentration; 0.67 mol/kg) was prepared.

[Synthesis Example 2] Preparation of Adhesive Layer-Forming Urethane Resin (A-2) Composition To a four-necked flask equipped with a stirrer, a reflux condenser, a thermometer, and a nitrogen capillary tube, 500 parts by mass of polytetramethylene glycol (number-average molecular weight: 2,000), 3 parts by mass of ethylene glycol, 12 parts by mass of DMPA, and 403 parts by mass of methyl ethyl ketone were added in a nitrogen stream. After the above components had been mixed to form a uniform mixture, 79 parts by mass of TDI was added to the mixture. Then, 0.1 parts by mass of dibutyltin dilaurate was added to the mixture. Subsequently, a reaction was conducted at 70° C. for about 4 hours. Then, 11 parts by mass of 1,3-BG was added to the flask. After a reaction had been conducted at 70° C. for about 1 hour, the reaction was terminated. Hereby, a methyl ethyl ketone solution of a urethane polymer was prepared. To the methyl ethyl ketone solution of a urethane polymer prepared by the above-described method, 9 parts by mass of triethylamine was added in order to neutralize the carboxyl group included in the urethane polymer. Subsequently, 907 parts by mass of ion-exchange water was added to the solution. Then, methyl ethyl ketone was removed from the solution by distillation under reduced pressure. Hereby, an adhesive layer-forming urethane resin (A-2) composition (nonvolatile content; 40% by mass, weight-average molecular weight; 46,000, anionic group concentration; 0.15 mmol/g, aromatic ring concentration; 0.75 mol/kg) was prepared.

[Synthesis Example 3] Preparation of Adhesive Layer-Forming Urethane Resin (A-3) Composition To a four-necked flask equipped with a stirrer, a reflux condenser, a thermometer, and a nitrogen capillary tube, 500 parts by mass of polypropylene glycol (number-average molecular weight: 2,000), 9 parts by mass of 1,4-butanediol, 10 parts by mass of DMPA, and 400 parts by mass of methyl ethyl ketone were added in a nitrogen stream. After the above components had been mixed to form a uniform mixture, 78 parts by mass of TDI was added to the mixture. Then, 0.1 parts by mass of dibutyltin dilaurate was added to the mixture. Subsequently, a reaction was conducted at 70° C. for about 4 hours. Then, 4 parts by mass of 1,3-BG was added to the flask. After a reaction had been conducted at 70° C. for about 1 hour, the reaction was terminated. Hereby, a methyl ethyl ketone solution of a urethane polymer was prepared. To the methyl ethyl ketone solution of a urethane polymer prepared by the above-described method, 7 parts by mass of N,N-dimethylethanolamine was added in order to neutralize the carboxyl group included in the urethane polymer. Subsequently, 901 parts by mass of ion-exchange water was added to the solution. Then, methyl ethyl ketone was removed from the solution by distillation under reduced pressure. Hereby, an adhesive layer-forming urethane resin (A-3) composition (nonvolatile content; 40% by mass, anionic group concentration; 0.13 mmol/g, weight-average molecular weight; 68,000, aromatic ring concentration; 0.74 mol/kg) was prepared.

[Synthesis Example 4] Preparation of Adhesive Layer-Forming Urethane Resin (A-4) Composition To a four-necked flask equipped with a stirrer, a reflux condenser, a thermometer, and a nitrogen capillary tube, 500 parts by mass of polytetramethylene glycol (number-average molecular weight: 1,000), 15 parts by mass of DMPA, and 428 parts by mass of methyl ethyl ketone were added in a nitrogen stream. After the above components had been mixed to form a uniform mixture, 117 parts by mass of TDI was added to the mixture. Then, 0.1 parts by mass of dibutyltin dilaurate was added to the mixture. Subsequently, a reaction was conducted at 70° C. for about 4 hours. Then, 11 parts by mass of 1,3-butanediol was added to the flask. After a reaction had been conducted at 70° C. for about 1 hour, the reaction was terminated. Hereby, a methyl ethyl ketone solution of a urethane polymer was prepared. To the methyl ethyl ketone solution of a urethane polymer prepared by the above-described method, 10 parts by mass of N,N-dimethylethanolamine was added in order to neutralize the carboxyl group included in the urethane polymer. Subsequently, 964 parts by mass of ion-exchange water was added to the solution. Then, methyl ethyl ketone was removed from the solution by distillation under reduced pressure. Hereby, an adhesive layer-forming urethane resin (A-4) composition (nonvolatile content; 40% by mass, anionic group concentration; 0.17 mmol/g, weight-average molecular weight; 55,000, aromatic ring concentration; 1.05 mol/kg) was prepared.

[Synthesis Example 5] Preparation of Skin Layer-Forming Urethane Resin (X-1) Composition In the presence of 3,281 parts by mass of methyl ethyl ketone and 0.1 parts by mass of stannous octoate, the reaction of 1,000 parts by mass of polycarbonate polyol ("NIPPOLLAN 980R" produced by Nippon Polyurethane Industry Co., Ltd., number-average molecular weight; 2,000), 17 parts by mass of DMPA, 47 parts by mass of ethylene glycol, and 344 parts by mass of diphenylmethane diisocyanate (hereinafter, abbreviated as "MDI") was conducted at 70° C. until the viscosity of the resulting solution reached 20,000 mPa·s. Subsequently, 3 parts by mass of methanol was added to the solution to stop the reaction. Hereby, a methyl ethyl ketone solution of a urethane resin was prepared. With the urethane resin solution, 70 parts by mass of polyoxyethylene distyrenated phenyl ether (hydrophile-lipophile balance (hereinafter, abbreviated as "HLB"); 14, average number of moles of the oxyethylene group added; 10, hereinafter, referred to simply as "(Y-1)") and 13 parts by mass of triethylamine were mixed. To the resulting mixture, 800 parts by mass of ion-exchange water was added to perform phase inversion emulsification. Hereby, an emulsified liquid including the urethane resin (X-1) dispersed in water was prepared.

Then, methyl ethyl ketone was removed from the emulsified liquid by distillation. Hereby, a skin layer-forming urethane resin (X-1) composition having a nonvolatile content; 40% by mass and an aromatic ring content; 1.95 mol/kg was prepared.

[Synthesis Example 6] Preparation of Skin Layer-Forming Urethane Resin (X-2) Composition In the presence of 3,281 parts by mass of methyl ethyl ketone and 0.1 parts by mass of stannous octoate, the reaction of 1,000 parts by mass of polyether polyol ("PTMG2000" produced by Mitsubishi Chemical Corporation, number-average molecular weight; 2,000), 17 parts by mass of DMPA, 47 parts by mass of ethylene glycol, and 344 parts by mass of MDI was conducted at 70° C. until the viscosity of the resulting solution reached 20,000 mPa·s. Subsequently, 3 parts by mass of methanol was added to the solution to stop the reaction. Hereby, a methyl ethyl ketone solution of a urethane resin was prepared. With the urethane resin solution, 70 parts by mass of (Y-1) and 13 parts by mass of triethylamine were mixed. To the resulting mixture, 800 parts by mass of ion-exchange water was added to perform phase inversion emulsification. Hereby, an emulsified liquid including the urethane resin (X-2) dispersed in water was prepared.

Then, methyl ethyl ketone was removed from the emulsified liquid by distillation. Hereby, a skin layer-forming urethane resin (X-2) composition having a nonvolatile content; 40% by mass and an aromatic ring content; 1.95 mol/kg was prepared.

[Comparative Synthesis Example 1] Preparation of Adhesive Layer-Forming Urethane Resin (AR-1) Composition To a four-necked flask equipped with a stirrer, a reflux condenser, a thermometer, and a nitrogen capillary tube, 500 parts by mass of polytetramethylene glycol (number-average molecular weight: 1,000), 15 parts by mass of DMPA, and 450 parts by mass of methyl ethyl ketone were added in a nitrogen stream. After the above components had been mixed to form a uniform mixture, 149 parts by mass of isophorone diisocyanate (hereinafter, abbreviated as "IPDI") was added to the mixture. Then, 0.1 parts by mass of dibutyltin dilaurate was added to the mixture. Subsequently, a reaction was conducted at 70° C. for about 4 hours. Then, 11 parts by mass of 1,3-BG was added to the flask. A reaction was conducted at 70° C. for 1 hour. Hereby, a methyl ethyl ketone solution of a urethane prepolymer was prepared. To the methyl ethyl ketone solution of a urethane polymer prepared by the above-described method, 10 parts by mass of N,N-dimethylethanolamine was added in order to neutralize the carboxyl group included in the urethane polymer. Subsequently, 1,012 parts by mass of ion-exchange water was added to the solution. After a reaction had been completed, methyl ethyl ketone was removed from the solution by distillation under reduced pressure. Hereby, an adhesive layer-forming urethane resin (AR-1) composition (nonvolatile content; 40% by mass, anionic group concentration; 0.16 mmol/g, weight-average molecular weight; 28,000, aromatic ring concentration; 0 mol/kg) was prepared.

[Comparative Synthesis Example 2] Preparation of Skin Layer-Forming Urethane Resin (XR-1) Composition To a four-necked flask equipped with a stirrer, a reflux condenser, a thermometer, and a nitrogen capillary tube, 100 parts by mass of polycarbonate diol ("DURANOL T5652" produced by Asahi Kasei Chemicals Corporation, number-average molecular weight: 2,000), 100 parts by mass of polytetramethylene glycol (number-average molecular weight: 1,000), 20 parts by mass of DMPA, and 151 parts by mass of methyl ethyl ketone were added in a nitrogen stream. After the above components had been mixed to form a uniform mixture, 133 parts by mass of IPDI was added to the mixture. Then, 0.1 parts by mass of dibutyltin dilaurate was added to the mixture. Subsequently, a reaction was conducted at 70° C. for about 4 hours. To the methyl ethyl ketone solution of a urethane polymer prepared by the above-described method, 15 parts by mass of triethylamine was added in order to neutralize the carboxyl group included in the urethane polymer. Subsequently, 683 parts by mass of ion-exchange water was added to the solution. Then, 15 parts by mass of 80 mass % hydrazine hydrate was added to the solution, and a reaction was conducted. After a reaction had been completed, methyl ethyl ketone was removed from the solution by distillation under reduced pressure. Hereby, a skin layer-forming urethane resin (XR-1) composition (nonvolatile content; 35% by mass, urea bond concentration; 2.6 mol/kg, and aromatic ring concentration; 0 mol/kg) was prepared.

Example 1 <Production of Synthetic Leather>

A liquid mixture of 100 parts by mass of the skin layer-forming urethane resin (X-1) composition prepared in Synthesis example 5, 10 parts by mass of a water-dispersible black pigment ("DILAC HS-9530" produced by DIC Corporation), and 1 part by mass of an associative thickener ("HYDRAN ASSISTER T10" produced by DIC Corporation) was applied to a flat release paper sheet ("DN-TP-155T" produced by Ajinomoto Co., Inc.) so as to form a coating layer having a thickness of 30 μm after being dried. The coating layer was dried at 70° C. for 2 minutes and at 120° C. for another 2 minutes.

Then, a liquid mixture of 100 parts by mass of the adhesive layer-forming urethane resin (A-1) composition prepared in Synthesis example 1, 1 part by mass of an associative thickener ("HYDRAN ASSISTER T10" produced by DIC Corporation), and 9 parts by mass of a polyisocyanate crosslinking agent ("HYDRAN ASSISTER C5" produced by DIC Corporation) was applied thereto so as to form a coating layer having a thickness of 50 μm after being dried. The coating layer was dried at 70° C. for 3 minutes. Immediately after the coating layer had been dried, a nonwoven fabric impregnated with polyurethane was bonded to the dried coating layer. Subsequently, a heat treatment was performed at 120° C. for 2 minutes. After aging had been performed at 50° C. for 2 days, the release paper sheet was removed. Hereby, a synthetic leather was prepared.

Examples 2 to 8 and Comparative Examples 1 and 2

A synthetic leather was prepared as in Example 1, except that the types of the skin layer-forming urethane resin composition used and the adhesive layer-forming urethane resin composition used were changed as described in Tables 1 to 3.

[Methods for Measuring Number-Average Molecular Weight and Weight-Average Molecular Weight]

The number-average molecular weights of the polyols used in Synthesis examples above and the important average molecular weights of the urethane resins used in Synthesis examples above are the values measured by gel permeation column chromatography (GPC) under the following conditions.

Measuring equipment: High-speed GPC equipment ("HLC-8220GPC" produced by Tosoh Corporation)

Columns: the following columns produced by Tosoh Corporation were connected to one another in series.
"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1
Detector: RI (differential refractometer)
Column temperature: 40° C.

Eluent: Tetrahydrofuran (THF)
Flow rate: 1.0 mL/min
Injection volume: 100 μL (tetrahydrofuran solution having a sample concentration of 0.4 mass %)
Reference samples: A calibration curve was prepared using the following standard polystyrenes.
(Standard Polystyrenes)
"TSKgel standard polystyrene A-500" produced by Tosoh Corporation
"TSKgel standard polystyrene A-1000" produced by Tosoh Corporation
"TSKgel standard polystyrene A-2500" produced by Tosoh Corporation
"TSKgel standard polystyrene A-5000" produced by Tosoh Corporation
"TSKgel standard polystyrene F-1" produced by Tosoh Corporation
"TSKgel standard polystyrene F-2" produced by Tosoh Corporation
"TSKgel standard polystyrene F-4" produced by Tosoh Corporation
"TSKgel standard polystyrene F-10" produced by Tosoh Corporation
"TSKgel standard polystyrene F-20" produced by Tosoh Corporation
"TSKgel standard polystyrene F-40" produced by Tosoh Corporation
"TSKgel standard polystyrene F-80" produced by Tosoh Corporation
"TSKgel standard polystyrene F-128" produced by Tosoh Corporation
"TSKgel standard polystyrene F-288" produced by Tosoh Corporation
"TSKgel standard polystyrene F-550" produced by Tosoh Corporation

[Method for Measuring Peel Strength]

Each of the synthetic leathers prepared in Examples and Comparative examples was subjected to Shimadzu Autograph "AG-1" (produced by Shimadzu Corporation) to measure peel strength at a full scale of 5 kg and a head speed of 20 mm/min. An evaluation was made in the following manner.

"A"; 0.15 MPa or more
"B"; 0.1 MPa or more and less than 0.15 MPa
"C"; Less than 0.1 MPa

[Chemical Resistance Evaluation]

A filter paper impregnated with a specific amount of oleic acid having the same weight as the skin layer was placed on the skin layer of each of the synthetic leathers prepared in Examples and Comparative examples. The synthetic leathers were then left to stand at 80° C. for 24 hours. Subsequently, the filter paper was removed. After the oleic acid had been cleaned with a waste, the appearance of each of the synthetic leathers was inspected. An evaluation was made in the following manner.

"A"; No change was confirmed in appearance.
"B"; Swelling of only a small part of the synthetic leather was confirmed in appearance, but the detachment of the skin layer was not confirmed.

"C"; Swelling of the synthetic leather was clearly confirmed in appearance, but the detachment of the skin layer was not confirmed.

"D"; Swelling of the synthetic leather was clearly confirmed in appearance, and the detachment of a part of the skin layer was confirmed.

[Method for Evaluating Hydrolysis Resistance]

Each of the synthetic leathers prepared in Examples and Comparative examples was left to stand at 70° C. and a humidity of 95% for 5 weeks and, subsequently, the appearance of the synthetic leather was inspected. Furthermore, the synthetic leather was touched by fingers. An evaluation was made in the following manner.

"A"; No abnormality was observed in appearance or when touched by fingers.

"B"; Gloss was changed in appearance, but no abnormality was observed when touched by fingers.

"C"; Gloss was changed in appearance, and stickiness was confirmed.

[Method for Evaluating Lightfastness]

Each of the synthetic leathers prepared in Examples and Comparative examples was exposed to a NOx gas having a concentration of 650 ppm for 1 hour, and the degree of yellowing of the synthetic leather subsequent to the exposure was visually inspected. An evaluation was made in the following manner.

"A"; No change was confirmed in appearance.

"B"; Slight yellowing was observed in appearance.

"C"; Significant yellowing was observed in appearance.

TABLE 1

|  |  | Example 1 | Example 2 | Example 3 | Example 4 |
|---|---|---|---|---|---|
| Adhesive layer (ii) | Type of adhesive layer-forming urethane resin composition | (A-1) | (A-2) | (A-3) | (A-4) |
|  | Type of polyisocyanate | TDI | TDI | TDI | TDI |
|  | Anionic group concentration in urethane resin (A) (mmol/g) | 0.11 | 0.15 | 0.13 | 0.17 |
|  | Aromatic ring concentration in urethane resin (A) (mol/kg) | 0.67 | 0.75 | 0.74 | 1.05 |
|  | Weight-average molecular weight of urethane resin (A) | 29,000 | 46,000 | 68,000 | 55,000 |
| Skin layer (iii) | Type of skin layer-forming urethane resin composition | (X-1) | (X-1) | (X-1) | (X-1) |
|  | Type of polyisocyanate | MDI | MDI | MDI | MDI |
|  | Urea bond concentration in urethane resin (X) (mol/kg) | 0 | 0 | 0 | 0 |
|  | Aromatic ring concentration in urethane resin (X) (mol/kg) | 1.95 | 1.95 | 1.95 | 1.95 |
| Peel strength evaluation |  | A | A | A | A |
| Chemical resistance evaluation |  | A | A | A | A |
| Hydrolysis resistance evaluation |  | A | A | A | A |
| Lightfastness evaluation |  | A | A | A | A |

TABLE 2

|  |  | Example 5 | Example 6 | Example 7 | Example 8 |
|---|---|---|---|---|---|
| Adhesive layer (ii) | Type of adhesive layer-forming urethane resin composition | (A-1) | (A-2) | (A-3) | (A-4) |
|  | Type of polyisocyanate | TDI | TDI | TDI | TDI |
|  | Anionic group concentration in urethane resin (A) (mmol/g) | 0.11 | 0.15 | 0.13 | 0.17 |

TABLE 2-continued

|  |  | Example 5 | Example 6 | Example 7 | Example 8 |
|---|---|---|---|---|---|
|  | Aromatic ring concentration in urethane resin (A) (mol/kg) | 0.67 | 0.75 | 0.74 | 1.05 |
|  | Weight-average molecular weight of urethane resin (A) | 29,000 | 46,000 | 68,000 | 55,000 |
| Skin layer (iii) | Type of skin layer-forming urethane resin composition | (X-2) | (X-2) | (X-2) | (X-2) |
|  | Type of polyisocyanate | MDI | MDI | MDI | MDI |
|  | Urea bond concentration in urethane resin (X) (mol/kg) | 0 | 0 | 0 | 0 |
|  | Aromatic ring concentration in urethane resin (X) (mol/kg) | 1.95 | 1.95 | 1.95 | 1.95 |
| Peel strength evaluation |  | A | A | A | A |
| Chemical resistance evaluation |  | B | B | B | B |
| Hydrolysis resistance evaluation |  | A | A | A | A |
| Lightfastness evaluation |  | A | A | A | A |

TABLE 3

|  |  | Comparative example 1 | Comparative example 2 | Comparative example 3 |
|---|---|---|---|---|
| Adhesive layer (ii) | Type of adhesive layer-forming urethane resin composition | (AR-1) | (A-1) | (AR-1) |
|  | Type of polyisocyanate | IPDI | TDI | IPDI |
|  | Anionic group concentration in urethane resin (A) (mmol/g) | 0.16 | 0.11 | 0.16 |
|  | Aromatic ring concentration in urethane resin (A) (mol/kg) | 0 | 0.67 | 0 |
|  | Weight-average molecular weight of urethane resin (A) | 28,000 | 29,000 | 28,000 |
| Skin layer (iii) | Type of skin layer-forming urethane resin composition | (XR-1) | (XR-1) | (X-1) |
|  | Type of polyisocyanate | IPDI | IPDI | MDI |
|  | Urea bond concentration in urethane resin (X) (mol/kg) | 2.6 | 2.6 | 0 |
|  | Aromatic ring concentration in urethane resin (X) (mol/kg) | 0 | 0 | 1.95 |
| Peel strength evaluation |  | C | A | C |
| Chemical resistance evaluation |  | D | C | B |
| Hydrolysis resistance evaluation |  | C | B | A |
| Lightfastness evaluation |  | B | B | A |

It was confirm that the synthetic leathers prepared in Examples 1 to 8, which are synthetic leathers according to the present invention, were excellent in terms of peel strength, chemical resistance, hydrolysis resistance, and lightfastness.

In contrast, in Comparative example 1, where the adhesive layer (ii) and the skin layer (iii) both did not include the urethane resin prepared using an aromatic polyisocyanate as a raw material, the synthetic leather was evaluated as poor in terms of peel strength, chemical resistance, and hydrolysis resistance.

In Comparative example 2, where the skin layer (iii) did not include the urethane resin prepared using an aromatic polyisocyanate as a raw material, the synthetic leather was evaluated as poor in terms of chemical resistance.

In Comparative example 3, where the adhesive layer (ii) did not include the urethane resin prepared using an aromatic polyisocyanate as a raw material, the synthetic leather was evaluated as poor in terms of peel strength.

The invention claimed is:

1. A synthetic leather comprising at least a base (i), an adhesive layer (ii), and a skin layer (iii),
   the adhesive layer (ii) and the skin layer (iii) being both formed of a urethane resin composition including a urethane resin and water, the urethane resin being produced using an aromatic polyisocyanate as a raw material;
   wherein the urethane resin composition forming the adhesive layer (ii) includes a urethane resin (A), which is produced using an aromatic polyisocyanate (a1) including toluene diisocyanate as a raw material, and water (B);
   wherein the urethane resin composition forming the skin layer (iii) includes a urethane resin (X), which is produced using an aromatic polyisocyanate (x1) including diphenylmethane diisocyanate as a raw material, a nonionic emulsifier (Y), and water (Z).

2. The synthetic leather according to claim 1, wherein the urethane resin (A) includes an anionic group, and the concentration of the anionic group in the urethane resin (A) is 0.35 mmol/g or less.

3. The synthetic leather according to claim 2, wherein the urethane resin (A) has an aromatic ring concentration of 0.1 to 2.5 mol/kg.

4. The synthetic leather according to claim 2, wherein the urethane resin (A) has a weight-average molecular weight of 2,000 to 150,000.

5. The synthetic leather according to claim 1, wherein the urethane resin (A) has an aromatic ring concentration of 0.1 to 2.5 mol/kg.

6. The synthetic leather according to claim 1, wherein the urethane resin (A) has a weight-average molecular weight of 2,000 to 150,000.

7. The synthetic leather according to claim 1, wherein the urethane resin (X) has a urea bond concentration of 1.2 mol/kg or less.

8. The synthetic leather according to claim 7, wherein the urethane resin (X) has an aromatic ring concentration of 0.1 to 50 mol/kg.

9. The synthetic leather according to claim 1, wherein the urethane resin (X) has an aromatic ring concentration of 0.1 to 50 mol/kg.

* * * * *